United States Patent
He et al.

(10) Patent No.: US 10,332,168 B2
(45) Date of Patent: Jun. 25, 2019

(54) LINE POSITION BIDDING

(71) Applicant: PAYPAL, INC., San Jose, CA (US)

(72) Inventors: Robert He, Pflugerville, TX (US); Bryant Genepang Luk, Round Rock, TX (US); Christopher Diebold O'Toole, Cedar Park, TX (US)

(73) Assignee: PayPal, Inc., San Jose, CA (US)

( * ) Notice: Subject to any disclaimer, the term of this patent is extended or adjusted under 35 U.S.C. 154(b) by 889 days.

(21) Appl. No.: 14/558,514

(22) Filed: Dec. 2, 2014

(65) Prior Publication Data

US 2016/0155166 A1    Jun. 2, 2016

(51) Int. Cl.
*G06Q 30/06*    (2012.01)
*G06Q 50/18*    (2012.01)

(52) U.S. Cl.
CPC ..... *G06Q 30/0611* (2013.01); *G06Q 30/0643* (2013.01); *G06Q 50/188* (2013.01)

(58) Field of Classification Search
CPC .. H04L 67/306; H04L 67/325; G06Q 30/0611
See application file for complete search history.

(56) References Cited

U.S. PATENT DOCUMENTS

| | | | |
|---|---|---|---|
| 9,137,086 B1* | 9/2015 | Naik | H04L 29/0602 |
| 2007/0055554 A1* | 3/2007 | Sussman | G06Q 10/02 705/5 |
| 2015/0186957 A1* | 7/2015 | Barr | G06Q 30/0281 705/346 |
| 2015/0227969 A1* | 8/2015 | Hanly | G06Q 30/0252 705/14.5 |

OTHER PUBLICATIONS

Cohen, NFL Fans Selling Seat Licenses, PSL Wait-List Positions, Aug. 2009.*

* cited by examiner

*Primary Examiner* — Aryan E Weisenfeld
(74) *Attorney, Agent, or Firm* — Haynes and Boone, LLP

(57) ABSTRACT

A system or method is provided to allow customers or users to bid for positions in a line. In particular, the system may determine the positions of various users in line and may set up a line bidding interface for the line. The line bidding interface may present users with various information of the line and various bidding options. The system may allow a user to post the user's line position for others to bid on. Further, the system may allow a user to post a monetary offer for another user to leave or switch line position. The system also may allow one or more users to bid for another user to leave the front of the line. For example, one or more users may crowd source a monetary offer for a user who is in the front of the line to leave.

20 Claims, 6 Drawing Sheets

LINE POSITION BIDDING

BACKGROUND

Field of the Invention

The present invention generally relates to line management, and in particular, to systems and methods for implementing line position bidding.

Related Art

Public venues such as airports, amusement parks, merchant stores and the like, sometimes require customers to wait in line to purchase products, receive services, or access certain facilities. Merchants or operators of public venues may estimate and provide wait time information to customers, such that customers may know how long the wait time is for a line or a queue. However, customers typically have no other options but to wait in their respective positions in line. As such, there is a need for a system or method that provides other options for the customers besides waiting in their respective positions in line.

Figure 1:
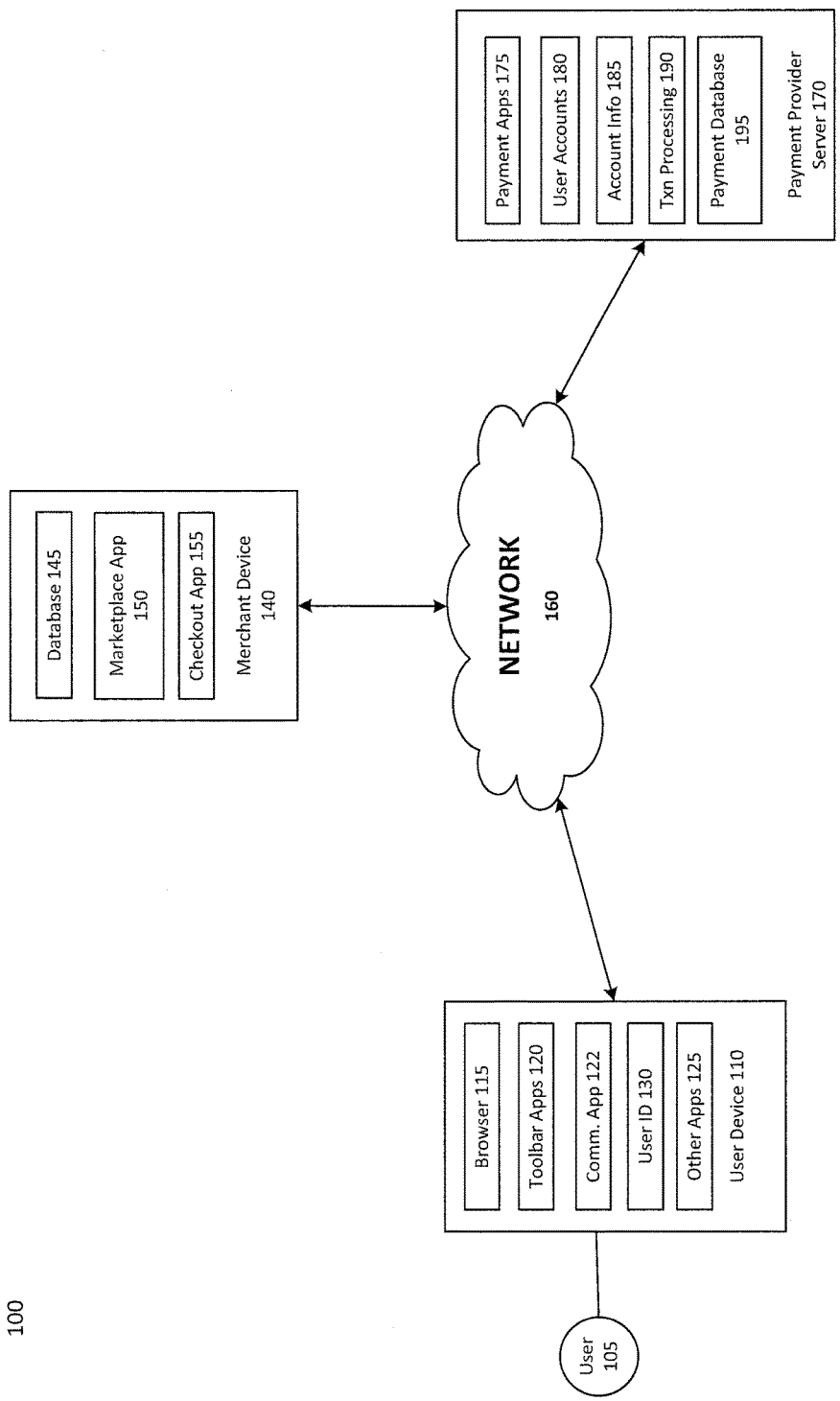
FIG. 1 is a block diagram of a networked system suitable for line position bidding according to an embodiment.

Embodiments of the present disclosure and their advantages are best understood by referring to the detailed description that follows. It should be appreciated that like reference numerals are used to identify like elements illustrated in one or more of the figures, wherein showings therein are for purposes of illustrating embodiments of the present disclosure and not for purposes of limiting the same.

DETAILED DESCRIPTION

According to an embodiment, a system or method is provided to allow customers or users to bid for positions in a line. In particular, the system may determine the positions of various users in line and may set up a line bidding interface for the line. The line bidding interface may present users with various information of the line and various bidding options.

In an embodiment, the system may provide information of the line to the users, such as number of people in line, the speed of the line, estimated wait time for each user based on each of their positions in line, and the like. The system also may present the user with historical information of the line, such as historical wait time, historical length of the line, and the like.

In an embodiment, the system may allow a user to post the user's line position for others to bid on. For example, the user may have a line position relative to the front of the line. The user may post the line position for other users to bid on. The post may include a starting price at which the user is willing to give up the user's line position or switch his position with another user who has a line position behind the user. The post also may include information about the user's position in line, estimated wait time for that position, user's information, such as picture, name, and the like.

In an embodiment, the system may allow a user to post a monetary offer for another user to leave or switch line position. For example, the user may wish to move up in a long line. The user may post an offer including the user's position in line with a monetary offer to switch to another position in the front area of the line. Other users who have positions in the front area may see the post and may decide whether to accept the offer.

In an embodiment, the system may allow one or more users to bid for another user to leave the front of the line. For example, one or more users may crowd source a monetary offer for a user who is in the front of the line to leave. As more users are willing to contribute to the monetary offer, the monetary offer may increase to better incentivize more users who are in the front of the line to leave.

In an embodiment, the line is a physical line and the positions of the user may be detected by wireless signals, such as Global Positioning System or Bluetooth Low Energy signals from BLE beacons. For example, a line position of a user may be estimated based on the strength of the BLE signal between the user's device and BLE beacons installed at one or more different locations in the line. In another embodiment, a grid of multiple BLE beacons may be installed or provided at the location of the line to track the location and movement of a user. Based on the BLE signals detected at the user's mobile device, the location of the user in the line may be determined by triangulation and by referencing the designated positions of the BLE beacons that emit the BLE signals. In another embodiment, the line is a virtual line, such as a waiting list online or on a telephone call. As such, the positions of the users are determined based on when the phone calls are received or when the users visit or sign in at a website. Each user may be assigned a position number in the line when they call or when they sign up. Thus, users who are in a hurry or want to be in a front part of a line now have the ability to move up, such as by switching places with someone or by incentivizing one or more people in front of the user to vacate their position in line. Users who are not in a hurry or necessarily need to be in a front of a line now have the ability to receive incentives, such as money, to move out or to a back of a line.

FIG. 1 is a block diagram of a networked system 100 suitable for implementing line position bidding according to an embodiment. Networked system 100 may comprise or implement a plurality of servers and/or software components that operate to perform various payment transactions or processes. Exemplary servers may include, for example, stand-alone and enterprise-class servers operating a server OS such as a MICROSOFT® OS, a UNIX® OS, a LINUX® OS, or other suitable server-based OS. It can be appreciated that the servers illustrated in FIG. 1 may be deployed in other ways and that the operations performed and/or the services provided by such servers may be combined or separated for a given implementation and may be performed by a greater number or fewer number of servers. One or more servers may be operated and/or maintained by the same or different entities.

System 100 may include a user device 110, a merchant server 140, and a payment provider server 170 in communication over a network 160. Payment provider server 170 may be maintained by a payment service provider, such as PayPal, Inc. of San Jose, Calif. A user 105, such as a sender or consumer, utilizes user device 110 to perform a transaction using payment provider server 170. User 105 may utilize user device 110 to initiate a payment transaction, receive a transaction approval request, or reply to the request. Note that transaction, as used herein, refers to any suitable action performed using the user device, including payments, transfer of information, display of information, etc. For example, user 105 may utilize user device 110 to bid on another user's line position or post user's position for bidding by others in a line. Although only one merchant server is shown, a plurality of merchant servers may be utilized if the user is purchasing products or services from multiple merchants.

In some embodiments, user device 110 may download an application from payment provider server 170 or from merchant server 140. The application may provide a line bidding interface that allows user 105 to request offers from others in line for user 105 to move out of a line or swap positions with someone farther back of the line and/or to solicit offers and make offers for user 105 to move closer to the front of the line, such as by having a recipient of the offer move out of line or switch positions with user 105. User device 110 may include a Bluetooth device configured to implement low energy Bluetooth communication. A network of low energy Bluetooth beacons may be installed at various line locations at various merchants or public venues. Thus, the location and movements of user device 110 at various line locations may be detected by the various Bluetooth beacons. The location and movement of user 105 and/or other users may be used to determine the respective line positions of the users in line.

User device 110, merchant server 140, and payment provider server 170 may each include one or more processors, memories, and other appropriate components for executing instructions such as program code and/or data stored on one or more computer readable mediums to implement the various applications, data, and steps described herein. For example, such instructions may be stored in one or more computer readable media such as memories or data storage devices internal and/or external to various components of system 100, and/or accessible over network 160. Network 160 may be implemented as a single network or a combination of multiple networks. For example, in various embodiments, network 160 may include the Internet or one or more intranets, landline networks, wireless networks, and/or other appropriate types of networks.

User device 110 may be implemented using any appropriate hardware and software configured for wired and/or wireless communication over network 160. For example, in one embodiment, user device 110 may be implemented as a personal computer (PC), a smart phone, wearable device, laptop computer, and/or other types of computing devices capable of transmitting and/or receiving data, such as an iPad™ from Apple™.

User device 110 may include one or more browser applications 115 which may be used, for example, to provide a convenient interface to permit user 105 to browse information available over network 160. For example, in one embodiment, browser application 115 may be implemented as a web browser configured to view information available over the Internet, such as a user account for setting up a shopping list and/or merchant sites for viewing and purchasing products and services. User device 110 may also include one or more toolbar applications 120 which may be used, for example, to provide client-side processing for performing desired tasks in response to operations selected by user 105. In one embodiment, toolbar application 120 may display a user interface in connection with browser application 115.

User device 110 may further include other applications 125 as may be desired in particular embodiments to provide desired features to user device 110. For example, other applications 125 may include security applications for implementing client-side security features, programmatic client applications for interfacing with appropriate application programming interfaces (APIs) over network 160, or other types of applications.

Applications 125 may also include email, texting, voice and IM applications that allow user 105 to send and receive emails, calls, and texts through network 160, as well as applications that enable the user to communicate, transfer information, make payments, and otherwise communicate and receive information for line position bidding as discussed herein. User device 110 includes one or more user identifiers 130 which may be implemented, for example, as operating system registry entries, cookies associated with browser application 115, identifiers associated with hardware of user device 110, or other appropriate identifiers, such as used for payment/user/device authentication. In one embodiment, user identifier 130 may be used by a payment service provider to associate user 105 with a particular account maintained by the payment provider. A communications application 122, with associated interfaces, enables user device 110 to communicate within system 100.

User device 110 may include a Bluetooth device configured to implement low energy Bluetooth (BLE) communication. For example, user device 110 may detect various low energy Bluetooth signals from Bluetooth beacons installed in a merchant's store or at various public venues. Thus, locations and movements of user device 110 may be determined by positioning techniques, such as triangulation or location fingerprinting. User device 110 also may include other location sensors, such as Global Positioning System (GPS), or movement sensors, such as gyroscope and/or accelerometer, that are configured to detect location and movement.

Merchant server 140 may be maintained, for example, by a merchant or seller offering various products and/or services or by an operator of a public venue. The merchant may have a physical point-of-sale (POS) store front. The merchant may be a participating merchant who has a merchant account with the payment service provider. Merchant server 140 may be used for POS or online purchases and transactions. Generally, merchant server 140 may be maintained by anyone or any entity that receives money, which includes charities as well as banks and retailers, or provides services and/or items to a user.

Merchant server 140 may include a database 145 identifying available products (including digital goods) and/or services (e.g., collectively referred to as items) which may be made available for viewing and purchase by user 105. Accordingly, merchant server 140 also may include a marketplace application 150 which may be configured to serve information over network 160 to browser 115 of user device 110. In one embodiment, user 105 may interact with marketplace application 150 through browser applications over network 160 in order to view various products, food items, or services identified in database 145.

Merchant server 140 also may include a checkout application 155 which may be configured to facilitate the purchase by user 105 of goods or services online or at a physical POS or store front. Checkout application 155 may be configured to accept payment information from or on behalf of user 105 through payment service provider server 170 over network 160. For example, checkout application 155 may receive and process a payment confirmation from payment service provider server 170, as well as transmit transaction information to the payment provider and receive information from the payment provider (e.g., a transaction ID). Checkout application 155 may be configured to receive payment via a plurality of payment methods including cash, credit cards, debit cards, checks, money orders, or the like.

Merchant server 140 may be connected to a network of Bluetooth beacons installed in the merchant's brick-and-mortar store or at the operator's public venue. The network of Bluetooth beacons may be installed at or near the line locations of the merchant's store or public venue to form a grid. Each Bluetooth beacon may emit a low energy Bluetooth signal in a specific frequency spectrum periodically. Thus, the network of Bluetooth may allow detection of locations and movements of the consumer at different line locations.

Payment provider server 170 may be maintained, for example, by an online payment service provider which may provide services between user 105 and the operator of merchant server 140. In this regard, payment provider server 170 includes one or more payment applications 175 which may be configured to interact with user device 110 and/or merchant server 140 over network 160 to facilitate the purchase of goods or services, communicate/display information, and send payments from or receive payments by user 105 of user device 110.

Payment provider server 170 also maintains a plurality of user accounts 180, each of which may include account information 185 associated with consumers, merchants, and funding sources, such as banks or credit card companies. For example, account information 185 may include private financial information of users of devices such as account numbers, passwords, device identifiers, user names, phone numbers, credit card information, bank information, or other financial information which may be used to facilitate online transactions by user 105. Advantageously, payment application 175 may be configured to interact with merchant server 140 on behalf of user 105 during a transaction with checkout application 155 to track and manage purchases made by users and which and when funding sources are used.

In some embodiments, payment provider server 170 may maintain a database including information regarding the line locations at respective merchant stores or public venues. The information regarding the line locations may be include floor layout of the merchant store or public venue, location of the line, shape, size, and/or orientation of the line, service or facility access associated with the line, BLE beacons associated with the line, historical wait times of different lines in different venues at different times of the day or year, and the like. Payment provider server 170 may periodically update the information regarding the line location. In an embodiment, the payment provider server 170 may maintain a line position bidding database storing line position offer postings and biddings from various users at various line locations. As such, the payment provider server 170 may facilitate bidding and transactions among different users for exchanging line positions and payments for the biddings.

A transaction processing application 190, which may be part of payment application 175 or separate, may be configured to receive information from user device 110 and/or merchant server 140 for processing and storage in a payment database 195. Transaction processing application 190 may include one or more applications to process information from user 105 for processing an order and payment and/or implementing line position bidding transactions as described herein. As such, transaction processing application 190 may store details of an order from individual users, including funding source used, credit options available, etc., as well as line positions, wait times, and lengths. Payment application 175 may be further configured to determine the existence of and to manage accounts for user 105, as well as create new accounts if necessary.

Figure 2:
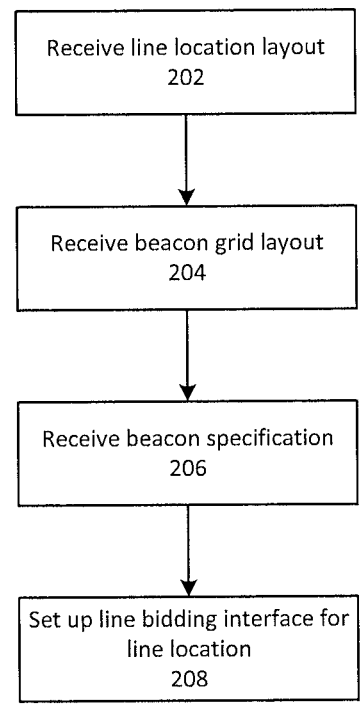
FIG. 2 is a flowchart showing a process for setting up line position bidding according to one embodiment.

FIG. 2 is a flowchart showing a process 200 for setting up line position bidding according to one embodiment. At step 202, user device 110 or payment provider server 170 may receive or access line location layouts of various merchants' stores and/or public venues. For example, floor layouts for grocery stores, retail stores, restaurants, museums, airports, amusements parks, stadiums, arenas, or other public venues visited by consumers may be received by user device 110 or payment provider server 170. Each layout may include a profile indicating the name of the merchant or operator of the public venue, the address, contact information, type of business, products or services offered, and other information related to the location. Payment provider server 170 may store the various layouts of line locations in a database each with its own profile. The layouts may indicate line locations where lines may be formed by consumers or users to gain access to certain amenities or to receive service.

At step 204, user device 110 or payment provider server 170 may receive or access layouts of networks of beacons corresponding to the store layouts received in step 202. The beacon layouts may be merged with their corresponding line location layouts, such that the coordinate of each beacon in the beacon grid may be designated. For example, a network of Bluetooth beacons may be installed in a merchant's store. Each Bluetooth beacon may be installed at a specific location in the merchant's store and may emit low energy Bluetooth signals. Thus, a network or grid of Bluetooth beacons may be formed in the merchant's store.

Figure 5:
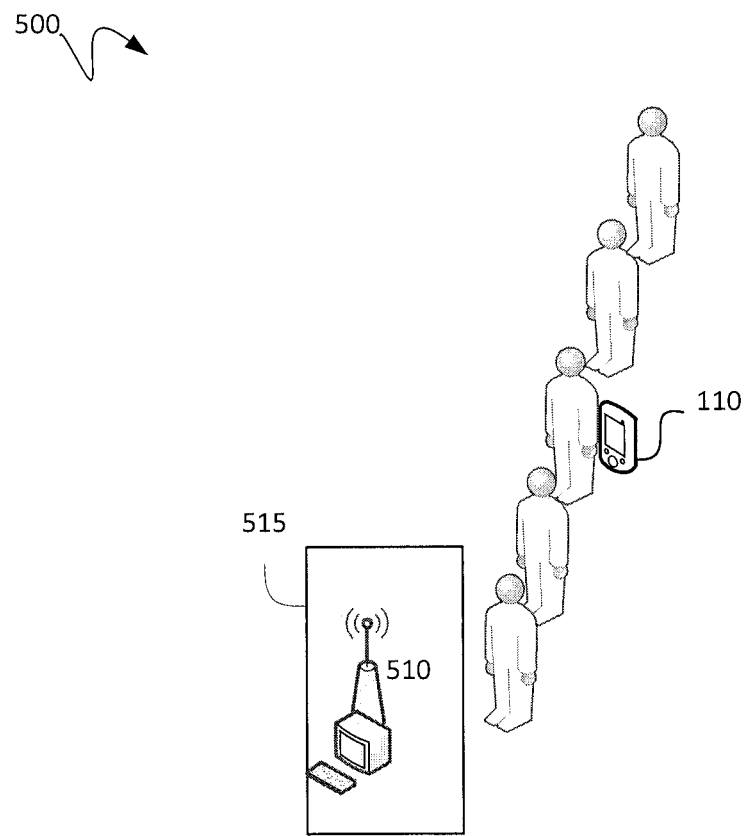
FIG. 5 is a diagram depicting customers waiting in line according to one embodiment.

As shown in FIG. 5, as an example, a Bluetooth beacon 510 may be installed at a checkout counter 515. The Bluetooth beacon 510 may be connected to merchant device 140. The Bluetooth beacon 510 may emit a low energy Bluetooth signal with specific frequency spectrum. User 105 may carry a user device 110 including a Bluetooth device configured to communicate via low energy Bluetooth communication. When user 105 enters the line location, user device 110 may detect Bluetooth beacons 510 installed at the checkout counter 515. Thus, the user 105 may be detected when the user 105 is standing in line via Bluetooth communication.

Returning back to FIG. 2, at step 206, user device 110 or payment provider server 170 may receive Bluetooth beacon specifications of various BLE beacons installed at respective line locations. Each Bluetooth beacon at the line location may emit a unique signal. A Bluetooth beacon database may be used to store profiles for each Bluetooth beacon. For example, each Bluetooth beacon may have a profile containing the Bluetooth beacon's line location, the unique signal signature of the beacon, the signal strength of the beacon, the broadcast range of the beacon, and the like. In some embodiments, a plurality of BLE beacons may be associated with a line location to provide better detection of the location and movement of users standing in line at the line location.

For a physical line, the position of the user 105 may be determined based on the Bluetooth signals received at user device 110 using techniques, such as triangulation or location fingerprinting. In the triangulation technique, the location of user device 110 may be determined based on the locations of three Bluetooth beacons 510 and the distance of user device 110 from the three Bluetooth beacons 510. The locations of the Bluetooth beacons 510 may be predetermined when the Bluetooth beacons 510 are installed at the line location. The distance between the Bluetooth beacons 510 and user device 110 may be determined based on the signal strength received between the Bluetooth beacons 510 and user device 110. A stronger signal may indicate a shorter distance while a weaker signal may indicate a longer distance. Thus, based on the Bluetooth signals between the Bluetooth beacons 510 and user device 110, the location of user device 110 may be determined using the triangulation technique.

Figure 6:
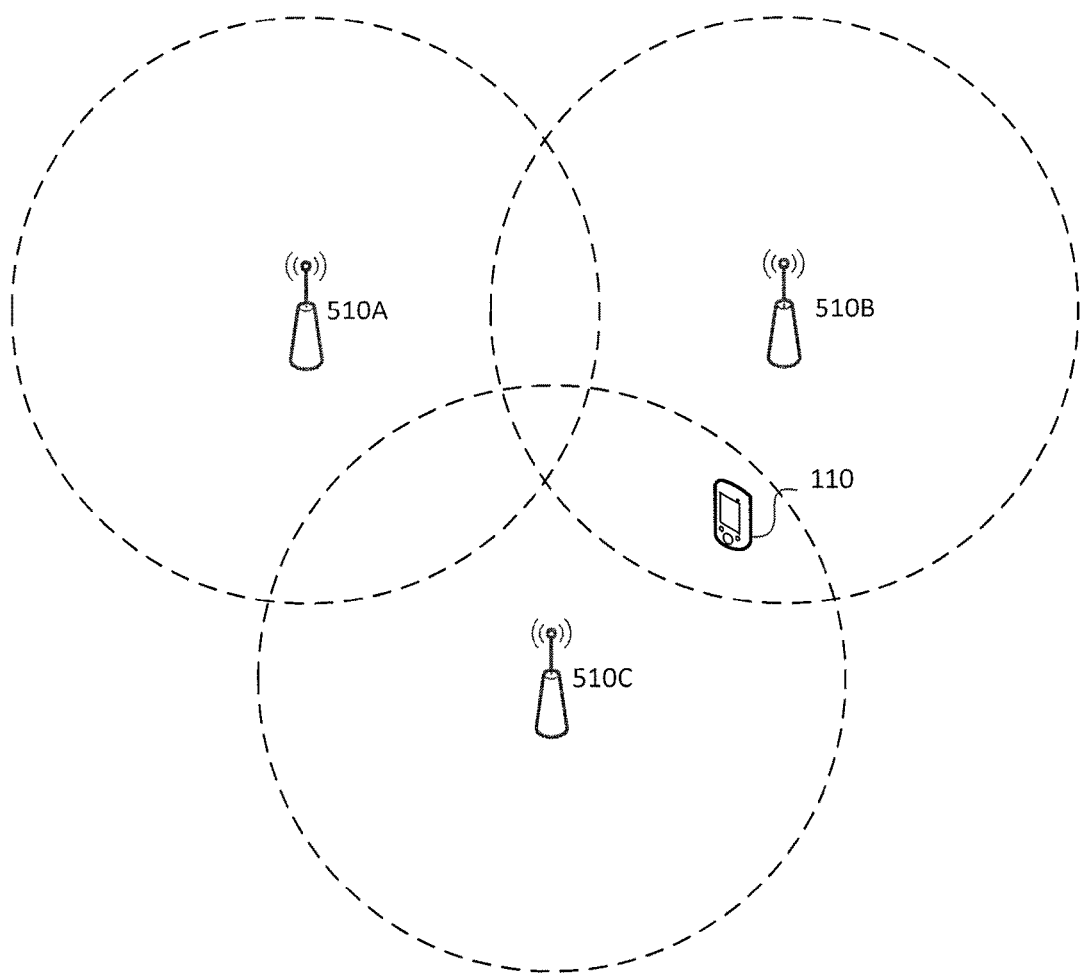
FIG. 6 is a diagram depicting a network of beacons according to one embodiment.

For example, as shown in FIG. 6, three Bluetooth beacons 510A, 510B, and 510C may each emit a unique Bluetooth signal. The signal range of each beacon may be illustrated as a circle of dashed line surrounding each beacon. As shown in FIG. 6, user device 110 may be located at a position at which user device 110 receives signals from beacon 510B and beacon 510C, but not beacon 510A. In particular, user device 110 receives signals with about the same signal strength from both beacons 510B and 510C. Thus, user device 110 is located between an area between beacons 510B and 510C, but away from 510A. Further, based on the signal strengths of the signals, the distance between user device 110 and beacons 510B and 510C may be determined. User device 110 or payment provider server 170 may analyze the signals and their signal strengths received at user device 110 and reference the locations of the beacons that emit these signals to determine the location of user device 110 by triangulation techniques.

In the location fingerprinting technique, a database of signal fingerprints at various locations within the public venue may be predetermined. For example, a signal profile may be predetermined for each location. The signal profile may include Bluetooth signals that are detected at that location and the strength of each of those detected Bluetooth signals. For example, as shown in FIG. 6, when user device 110 is positioned at a certain position between beacons 510B and 510C, a signal profile may be predetermined to indicate medium signals from beacons 510B and 510C and low or no signal from beacon 510A. A database of signal profiles associated with a plurality of respective locations on the shopping floor may be predetermined and stored. Thus, based on a signal profile detected by user device 110, a location of user device 110 may be determined by referencing the database of signal profiles.

In some embodiments, the signal profile may be the Bluetooth signal of user device 110 received by respective Bluetooth beacons. For example, as shown in FIG. 6, when user device 110 is positioned between beacons 510B and 510C, a signal profile may be predetermined to indicate medium signals received by beacons 510B and 510C, and weak or no signal received at beacon 510A. Thus, the signal fingerprints may be signals received by user device 110 or signals received by the respective Bluetooth beacons 510.

The location of user device 110 may be determined by user device 110. For example, user device 110 may download a layout map of the merchant or the public venue and may determine user device 110's position based on the Bluetooth signals detected and the floor layout of the Bluetooth beacons 510. In some embodiments, merchant device 140 may determine the location of user device 110 based on which Bluetooth beacons 510 detect user device 110 and the strength of the signal detected at the Bluetooth beacons 510. In some embodiments, the detected signals and signal strengths may be forwarded to payment provider server 170 and payment provider server 170 may determine the location of user device 110.

For a virtual line, the line position of the user 105 may be determined based on the order of users entering the line. For example, a position number may be assigned to the user 105 when the user 105 enters the ling by calling or by visiting a website. An estimated wait time and the line position of the user 105 may be presented to the user 105. For example, a notification: "Thank you for calling, you are customer number 14 and the estimated wait time is 18 minutes." The line position and the estimated wait time may be updated and notified to the user 105 periodically to keep the user 105 informed of the progress of the line.

At step 208, the system may set up a line position bidding interface for the line location. The line position bidding interface may provide information about a line, such as length of line and estimated wait time. Further, the system may receive postings from users who are offering their position in exchange for payment and/or biddings from users who are offering payments in exchange for moving up their positions in line. The system may continuously update and present the various postings and biddings at the line position bidding interface.

In an embodiment, the system may suggest different prices for different positions in line or for different locations. In particular, the system may estimate the prices based on crowd data or historical data. For example, the estimated price for a particular position in line may be determined based on how much people are willing to pay or how much people had paid for a certain position in line. The estimated price may vary based on the time, day, season, or other factors, such as current trend. For example, there may be a longer line and higher demand for a particular product on the day of the product release. As such, the price of a position in line for purchasing the particular product may have higher value, especially if the product has a limited supply such that people in the back of the line may not be able to purchase the product from the merchant's current inventory. In another example, a user at a front of a line to enter a general admission concert may have been waiting for 10 hours. That person's position in line may have a very high value if the end of the line is hundreds of people long.

Accordingly, process 200 may be used to set up line position bidding interfaces for lines at various merchant stores or public venues. For example, the line location, floor layout, number, specification, and locations of BLE beacons installed at the line location, and other related information may be collected and used to detect line positions of users and set up a line position bidding. Thus, based on the BLE communication set up at the line location, the system may detect the presence, location, and/or movement of users standing in line and may set up a line position bidding interface for the users to post, bid, and exchange line positions.

Figure 3:
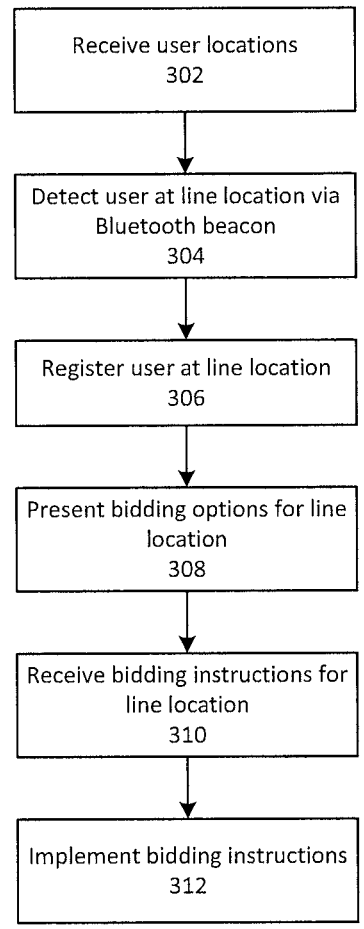
FIG. 3 is a flowchart showing a process for implementing line position bidding according to one embodiment.

FIG. 3 is a flowchart showing a process 300 for implementing line position bidding according to one embodiment. At step 302, merchant device 140 or payment provider server 170 may receive user 105's location. For example, as noted above, the location and/or movement of the user 105 may be detected by one or more BLE beacons installed at a store or public venue. In another embodiment, the location of the user 105 may be detected by GPS device or movement sensors included with user device 110.

At step 304, the presence of a user 105 at a line location may be detected by one or more BLE beacons. One or more BLE beacons may be installed at a line location of a store or a public venue. The presence of the user 105 may be detected by the BLE beacons when the user device 110 receives and responds to the BLE beacons' Bluetooth signals. For example, a grid of BLE beacons may be positioned along different positions of an anticipated line, such as from the front of a checkout terminal to the farthest distance the merchant expects a line to extend, in whatever shape the line is expected to take. The BLE beacon may broadcast a Bluetooth signal in an extending direction of the line. When the user 105 enters at the end of the line, the Bluetooth signal from the BLE beacon may be received by use device 110 which may respond with a Bluetooth signal back to the BLE beacon. Thus, the system may detect that the user 105 has entered the line location at a particular location of the merchant store. In other embodiments, line location of a user may be obtained through other means, such as self-reporting or reporting by others (such as others in line or a person counting positions of particular people in line).

In an embodiment, a plurality of BLE beacons may be installed at the line location to provide more accurate detection of the location and movement of the users at or near the line location. The plurality of BLE beacons may allow the system to detect the user 105's location and movement within the line location. For example, the BLE beacons may detect the presence of the user 105 and where the user 105 enters the line, the movement and speed of the user 105 in line, when and/or where the user 105 reaches the front of the line, and when and/or where the user 105 departs from the line location. The BLE beacons may also detect rates of movement within various locations in the line.

At step 306, the system may register the user 105 at the line location. In an embodiment, the system may send a query to the user 105 at the user device 110 to ask the user 105 whether the user 105 getting in line at the line location. For example, the query may state: "Are you getting in a queue at store A?" If the user 105 responds affirmatively, the system may then register the user 105 at the line location of store A.

The system may then determine the line position of the user 105 at the line location. Based on the user 105's line location, the system may assign a line position number to the user 105 and may estimate the wait time for the user 105's line position. In an embodiment, the system may send a notification or a message to the user device 110 notifying the user 105 of his or her current line position and the estimated wait time for that line position. In some embodiments, the system may provide the user 105 with status or progress information of the line, such as the length of the line (how many people), number of people in front of the user 105, number of people behind the user 105, availability of space, seats, products, or services at the merchant or venue, estimated availability of space, products or service based on the user 105's line position, estimated value of the user 105's line position based on historical data and current status of the line, and the like. As such, the user 105 may make proper decision on whether to pay for a better line position or to offer the user 105's line position for sale to others.

At step 308, the system may present the user 105 with bidding options for the line location. The system may inquire the user 105 whether the user 105 is interested in reviewing options for changing the user 105's position in line. If so, the system may present the line position bidding interface to the user 105 at user device 110. The line position bidding interface may present the user 105 with postings of other users who are standing in line. The posting may include other users' offers to sell their line position and/or other users' offers to buy line positions.

The line position bidding interface also may include current biddings and their respective progress. For example, a line position at a front of the line is currently open for bidding. The current bid and the progress may be presented in real time. A clock may be used to indicate the remaining time for the bid. As the line moves, the line position of each user may be updated continuously and the bidding process may also be updated to reflect the changing line position. Further, as users join or leave the line, the line positions of the users also may be updated.

A graphical representation of the line may be formulated and presented to the user 105. The graphical representation may depict a line of nodes representing positions in the line. One of the nodes may have a first color, such as blue, representing the line position of the user 105 in the line. Some of the nodes may have a second color, such as green, representing line positions that are offered for sale. Some of the nodes may have a third color, such as purple, representing line positions whose users are offering to pay for better line positions. Other graphical indicators also may be used to depict different status of each node or line position in the line. For example, flashing nodes may be used to indicate nodes that have biddings in progress.

When the user 105 selects a node, detail information about the selected node may be presented to the user, such as by a pop-up window. The detail information may include the line position number of the node, the ID of the user who currently occupies the line position, estimated wait time for the line position, bidding options for the line position, such as current price, status of bidding or offers, conditions for position exchange, and the like.

At step 310, the system may receive bidding instructions from the user 105. The system may provide various bidding options. In an embodiment, the system may allow the user 105 to offer the user 105's line position for sale. In particular, the user 105 may set the price and condition of the sale. For example, the user 105 may wish to receive money in exchange for the user 105 to leave the line or move to the end of the line. In another example, the user 105 may wish to receive money in exchange for another line position, such as a line position that has a longer wait time.

The user 105 may set the price for the line position. In an embodiment, the user 105 may set a starting price for the bidding process and the ending time for the bidding process. In another embodiment, the user 105 may set a fixed price for the line position, such that other users may pay the fixed price for the user 105's line position without the bidding process. In still another embodiment, the user 105 may allow the system to set a price for the line position. The system may set a price based on historical data and/or prices offered by other users in nearby line positions. The system also may update the price of the line position as the line progresses. For example, as the line progresses, the line position of the user 105 may move up gradually. The system may gradually increase the price of the user 105's line position accordingly.

If the user 105 chooses to offer the user 105's line position for sale in exchange for another line position, the price of the sale may be determined based on the line position being exchanged with the user 105's line position. For example, if the line position being exchanged with the user 105's line position is relatively close behind the user 105's line position, the price may be lower. However, if the line position being exchanged with the user 105's line position is relatively far behind the user 105's line position, the price may be higher. The system may automatically update the price as the line progresses and/or the distance between the user 105's line position and the line position being exchanged changes. In an embodiment, a price may not be set for the user 105's line position. Rather, the system may allow other users to offer prices for the user 105's line position. The user 105 may then choose to accept or reject the offers.

If the user 105 chooses to offer the user 105's line position for bidding, the user 105 or the system may set a starting price. Further, the user 105 may set a reserve price, which is a minimum price the user 105 is willing to sell the line position. The reserve price may or may not be shown to other users based on the user 105's preference. In an embodiment, the reserve price may be updated as the line progresses. For example, as the user 105's line position moves closer to the front of the line, the system may automatically increase the reserve price to reflect the increased value of the user 105's line position.

The user 105 may set an end time for the bidding process. For example, the user 105 may set a duration of the bidding process, such as 20 minutes. In another example, the user 105 may set an hour and minute when the bidding will end, such as 11:20 AM. In an embodiment, the user 105 may set a condition that ends the bidding process. For example, the user 105 may set a target price at which the bidding process will end when the bidding reaches that target price. In another example, the user 105 may end the bidding process when the user 105's line position reaches the front of the line or a certain position from the front of the line.

In another embodiment, the user 105 may post offers to purchase another user's line position. For example, the user 105 may compose a posting including a price offer to purchase a line position that is in the general front position. The user 105 may set a price range and a desired range of line positions. For example, the user 105 may desire to purchase a line position within 20 positions from the front of the line for a price between $10-15. The offer may be a position swap between the user 105 and the seller or a straight purchase in which the seller will leave the line after giving the position to the user 105 or will move to the end of the line. If the offer is for a position swap, the offer price or offer price range may change as the user 105's line position moves up in the line.

The offer posting may include the user 105's desired range of line position, the price or price range the user 105 is willing to pay, type of offer, such as position swap or direct purchase, the user 105's line position, estimated wait time of the user 105's line position, method of payment, and the like. The system may present the offer posting to users who have line positions within the user 105's desired line position range.

In an embodiment, the user 105 may join a group offer for another user to the leave the line. For example, each member in the group may agree to contribute a small amount, such as $1.00, to the group offer. The group offer may be presented to other users based on the other users' line positions and the line positions of the members in the group. For example, the group members may be in line positions 38, 45, 52, 59, 64, and 79 and each of the members may agree to contribute $1.00 to the group offer. The number of the line position indicates the order in the line counting from the front of the line. The group offer may be presented to the users in line positions 1-37 as a $6.00 offer to leave the line reflecting a group offer that includes contribution from all six members of the group. The group offer may be presented to users in line positions 39-44 as a $5.00 offer to leave the line reflecting a group offer that includes contributions from five of the six members, because the group member in line position 38 would not benefit from users in line positions 39-44 leaving the line. Similarly, the group offer may be presented to users in line positions 46-51 as a $4.00 offer to leave the line reflecting a group offer that includes contributions from four of the six members (52, 59, 64, and 79). As such, the offer price may be determined based on the positions of the group members and the positions of the recipients of the group offer.

After a group offer is taken, the group members may be notified of the acceptance of the group offer and the appropriate amount may be debited from the affected group members to the recipient of the group offer. The system may allow the group members to join and/or issue another group offer. The payment may be issued to the recipient or taker of the group offer after the system detects that the recipient or taker of the group offer has departed from the line location or moved to the back of the line.

In an embodiment, the user 105 may be presented with various offers to purchase the user 105's line position. The user 105 may be presented with options to accept one or more of the offers. The user 105 also may be presented with options to purchase or bid on other users' line positions. In an embodiment, the system may allow the user 105 to enter a target wait time the user 105 is willing to wait in line. The system may automatically determine various options for the user based on the target wait time. For example, the system may find line positions that are offered by other users and that have estimated wait time corresponding to the user 105's target wait time. The system may present these line positions for the user 105 to purchase.

At step 312, the system may implement the bidding instructions from the user 105. The user 105 may choose to accept one of the offers for the user 105's line position. In this case, the system may instruct the user 105 how to accept the offer based on the condition of the offer, such as leaving the line or swapping line position with a particular user. The system may monitor the user 105's movement and position to ensure that the user 105 has perform the condition, as requested by the offer, such as leaving the line or moving to another line position. If the user 105 has performed as instructed, the system may process the payment transaction to the user 105.

In another embodiment, the user 105 may post an offer to sell the user 105's line position. The system may analyze the user 105's offer and may present to other users who are qualified based on the offer conditions. For example, the user 105 may wish to purchase a line position in the front section of the line. The system may present the user 105's offer to users in the front section of the line. In still another embodiment, the user 105 may join a group offer. The system may present the group offer to users who are qualified to accept the group offer. Once the user 105's offer or group offer is accepted, the system may instruct the user 105 on how to receive the benefit of the offer. For example, if the user 105's offer to swap line position is accepted, the system may instruct user 105 to move up to the line position of the user who accepted the offer. After the user 105 has obtained the new line position, the system may automatically process payment from the user 105 to the user who accepted the offer.

Accordingly, the system may track the progress of various offers and biddings and may monitor the movements and positions of various users to confirm that the offers or bidding have been properly accepted or performed, before processing payments among the users. By using the above process 300, the line position bidding interface may be presented to the user for the user to review, browse, and post line position offers. Further, the system may accept the user's instructions for posing and/or accepting offers for exchanging line positions. The system also may monitor the movements and positions of users in line to provide instructions on how to perform or accept offers and confirm that the offers for line position exchanges are properly performed and accepted. The system may then process payments accordingly.

The above processes 200 and 300 may be executed by user device 110. In some embodiments, the processes 200 and 300 may be executed at merchant device 140 or payment provider server 170. In some other embodiments, above processes 200 and 300 may be executed by one or more of user device 110, merchant device 140, and payment provider server 170 in coordination with each other.

As described herein, a person has the ability to pay money (or other incentives) to move up in line or receive money (or other incentives) to move back in line or drop out of the line. People in line may be provided information to determine the value of the position in line relative to others. For example, in a general admission concert, where people in front of the line typically get the "best" seats, a position at the front of the line can be very valuable (analogous to a front row seat), especially to people much farther back in line. In this example, line bidding enables a person to effectively trade in their bleacher seat and money or other incentives for a front row seat or for a person to trade their front row seat for a bleacher seat and money or other incentives. People in line can be informed of the number of people in front of them, in back of them, the number of tickets sold for the event, the capacity of the venue, etc. that can help users decide value of line bidding.

In another example, people waiting in line to enter the premier of a blockbuster movie may receive information similar to the concert, so that a person in the back of line may move up to get a better seat, such as if the person is on a date, with kids, etc. In yet another example, people waiting in line to purchase a limited quantity item may be given information such as their current position in line, how many items are left, and/or how many items people in front of them may buy so that people in line can place a value on line bidding, especially if a user wants to make sure they get the item, but does not necessarily need to be one of the first ones in line. The estimated time to get to the front of the line may be useful information to someone farther back in line, especially if the person needs to be somewhere by a particular time.

Figure 4:
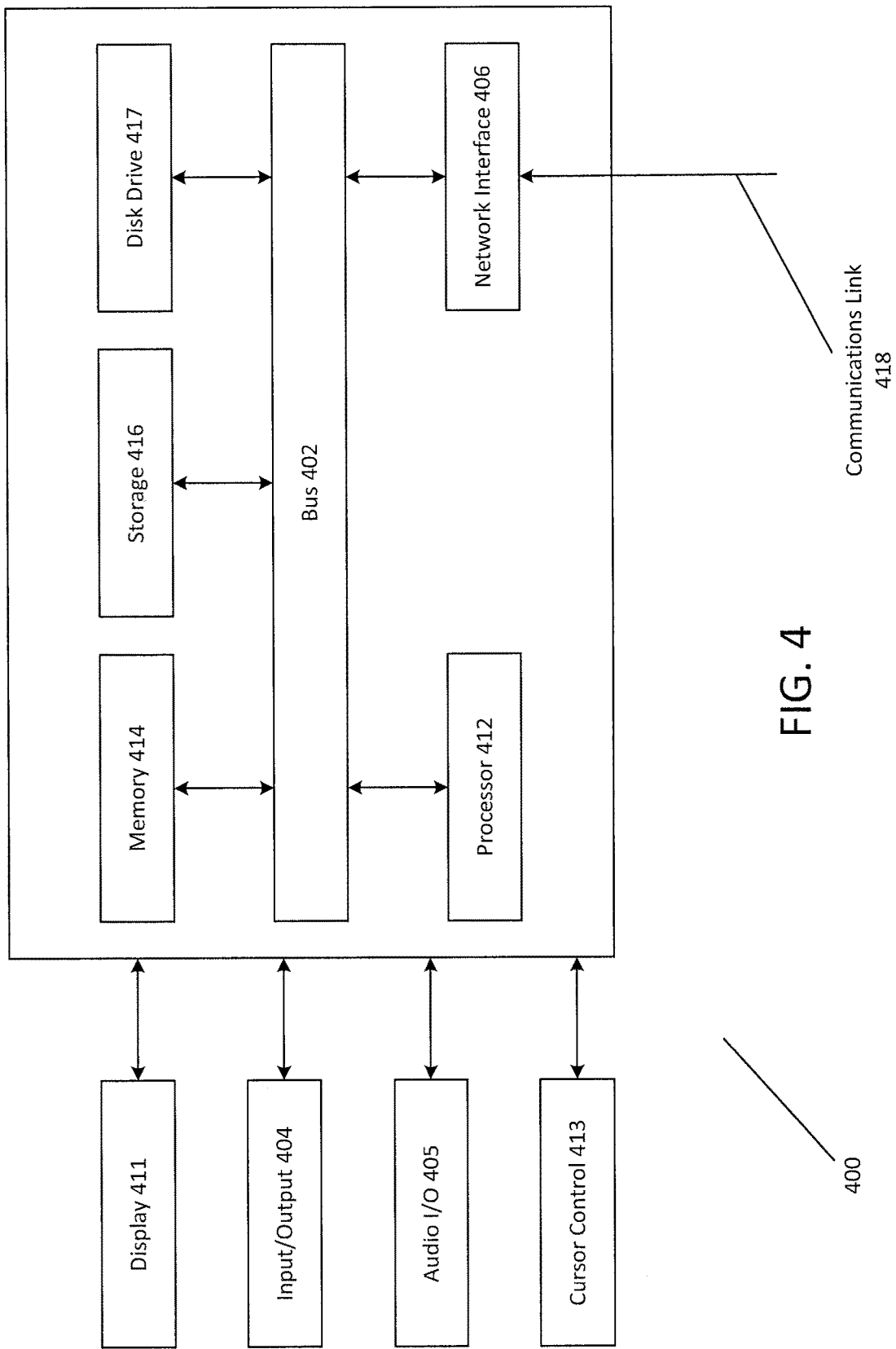
FIG. 4 is a block diagram of a computer system suitable for implementing one or more components in FIG. 1 according to one embodiment.

FIG. 4 is a block diagram of a computer system 400 suitable for implementing one or more embodiments of the present disclosure. In various implementations, the user device may comprise a personal computing device (e.g., smart phone, a computing tablet, a personal computer, laptop, PDA, Bluetooth device, key FOB, badge, etc.) capable of communicating with the network. The merchant and/or payment provider may utilize a network computing device (e.g., a network server) capable of communicating with the network. It should be appreciated that each of the devices utilized by users, merchants, and payment providers may be implemented as computer system 400 in a manner as follows.

Computer system 400 includes a bus 402 or other communication mechanism for communicating information data, signals, and information between various components of computer system 400. Components include an input/output (I/O) component 404 that processes a user action, such as selecting keys from a keypad/keyboard, selecting one or more buttons or links, etc., and sends a corresponding signal to bus 402. I/O component 404 may also include an output component, such as a display 411 and a cursor control 413 (such as a keyboard, keypad, mouse, etc.). An optional audio input/output component 405 may also be included to allow a user to use voice for inputting information by converting audio signals. Audio I/O component 405 may allow the user to hear audio. A transceiver or network interface 406 transmits and receives signals between computer system 400 and other devices, such as another user device, a merchant server, or a payment provider server via network 160. In one embodiment, the transmission is wireless, although other transmission mediums and methods may also be suitable. A processor 412, which can be a micro-controller, digital signal processor (DSP), or other processing component, processes these various signals, such as for display on computer system 400 or transmission to other devices via a communication link 418. Processor 412 may also control transmission of information, such as cookies or IP addresses, to other devices.

Components of computer system 400 also include a system memory component 414 (e.g., RAM), a static storage component 416 (e.g., ROM), and/or a disk drive 417. Computer system 400 performs specific operations by processor 412 and other components by executing one or more sequences of instructions contained in system memory component 414. Logic may be encoded in a computer readable medium, which may refer to any medium that participates in providing instructions to processor 412 for execution. Such a medium may take many forms, including but not limited to, non-volatile media, volatile media, and transmission media. In various implementations, non-volatile media includes optical or magnetic disks, volatile media includes dynamic memory, such as system memory component 414, and transmission media includes coaxial cables, copper wire, and fiber optics, including wires that comprise bus 402. In one embodiment, the logic is encoded in non-transitory computer readable medium. In one example, transmission media may take the form of acoustic or light waves, such as those generated during radio wave, optical, and infrared data communications.

Some common forms of computer readable media includes, for example, floppy disk, flexible disk, hard disk, magnetic tape, any other magnetic medium, CD-ROM, any other optical medium, punch cards, paper tape, any other physical medium with patterns of holes, RAM, PROM, EEPROM, FLASH-EEPROM, any other memory chip or cartridge, or any other medium from which a computer is adapted to read.

In various embodiments of the present disclosure, execution of instruction sequences to practice the present disclosure may be performed by computer system 400. In various other embodiments of the present disclosure, a plurality of computer systems 400 coupled by communication link 418 to the network (e.g., such as a LAN, WLAN, PTSN, and/or various other wired or wireless networks, including telecommunications, mobile, and cellular phone networks) may perform instruction sequences to practice the present disclosure in coordination with one another.

Where applicable, various embodiments provided by the present disclosure may be implemented using hardware, software, or combinations of hardware and software. Also, where applicable, the various hardware components and/or software components set forth herein may be combined into composite components comprising software, hardware, and/or both without departing from the spirit of the present disclosure. Where applicable, the various hardware components and/or software components set forth herein may be separated into sub-components comprising software, hardware, or both without departing from the scope of the present disclosure. In addition, where applicable, it is contemplated that software components may be implemented as hardware components and vice-versa.

Software, in accordance with the present disclosure, such as program code and/or data, may be stored on one or more computer readable mediums. It is also contemplated that software identified herein may be implemented using one or more general purpose or specific purpose computers and/or computer systems, networked and/or otherwise. Where applicable, the ordering of various steps described herein may be changed, combined into composite steps, and/or separated into sub-steps to provide features described herein.

The foregoing disclosure is not intended to limit the present disclosure to the precise forms or particular fields of use disclosed. As such, it is contemplated that various alternate embodiments and/or modifications to the present disclosure, whether explicitly described or implied herein, are possible in light of the disclosure. Having thus described embodiments of the present disclosure, persons of ordinary skill in the art will recognize that changes may be made in form and detail without departing from the scope of the present disclosure. Thus, the present disclosure is limited only by the claims.

What is claimed is:

1. A system comprising:
a non-transitory memory; and
one or more hardware processors coupled with the non-transitory memory and configured to read instructions from the non-transitory memory to cause the system to perform operations comprising:
obtaining a line location layout of a physical premise;
determining a layout of a network of short-range wireless beacons associated with the physical premise;
determining, based on the line location layout of the physical premise and the layout of the network of short-range wireless beacons, a plurality of beacon signal profiles for a plurality of corresponding line positions associated with the physical premise, wherein each beacon signal profile represents signal strengths from two or more short-range wireless beacons in the network of short-range wireless beacons corresponding to a line position;
determining that a first user has entered into the physical premise by detecting a wireless communication between a first device associated with the first user and at least one of the network of short-range wireless beacons;
in response to determining that the first user has entered into the physical premise, obtaining, from the first device associated with the first user, first signal data indicating signals received by the first device from at least two short-range wireless beacons in the network of short-range wireless beacons;
determining, for the first user, a first line position of the first user in a physical line comprising a plurality of users by matching the first signal data to a first beacon signal profile in the plurality of beacon signal profiles;
using the network of short-range wireless beacons to monitor movements of the plurality of users within the physical line;
estimating a value of the first line position based on a number of users being in front of the first user in the physical line and the monitored movements of the plurality of users;
generating a bidding interface for bidding line positions of the physical line, wherein the bidding interface displays the line location layout of the physical premise and a plurality of graphical elements representing respective line positions of the plurality of users on the line location layout, wherein a first graphical element representing the first line position of the first user is presented differently than at least one other graphical element within the plurality of graphical elements based on a first instruction from the first user to offer the first line position of the first user for bidding, and wherein the first graphical element indicates the estimated value as a bid starting price;
presenting the bidding interface on at least a second user device associated with a second user from the plurality of users;
receiving, via the bidding interface from the second user device, a second instruction for placing a bid on the first line position of the first user at a bidding price;
updating the bidding interface by modifying the first graphical element and a second graphical element representing a second line position of the second user to indicate that the first and second line positions are in a bidding process, wherein the updated bidding interface further displays the bidding price;
in response to receiving an acceptance of the bid from the first user device, determining that the second user has taken over the first line position of the first user in the physical line by matching second signal data indicating signals received by the second user device with the first beacon signal profile; and
in response to determining that the second user has taken over the first line position of the first user, automatically transferring the bidding price from a user account associated with the second user to a user account associated with the first user; and
updating the bidding interface to reflect changed line positions of the first user and the second user for users of the bidding interface.

2. The system of claim 1, wherein the first instruction comprises an offer to sell the first line position of the first user for a price.

3. The system of claim 1, wherein the operations further comprise presenting, via the bidding interface on the first user device, status information of the physical line comprising at least one of a length of the physical line, an estimated wait time for the first line position, a current availability of products or services offered for the physical line, or the estimated value of the first line position.

4. The system of claim 1, wherein the operations further comprise:
receiving, from the first user device via the bidding interface, a second bid for a third line position of a third user from the plurality of users; and
in response to receiving the second bid, updating the bidding interface by modifying a third graphical element representing the third line position to indicate that the third line position is in the bidding process.

5. The system of claim 4, wherein the second bid comprises a price offered by the first user for the third line position of the third user.

6. The system of claim 5, wherein the operations further comprise:
in response to receiving an acceptance of the second bid from a user device of the third user, determining that the first user has taken over the third line position by matching third signal data received from the first user device with a second beacon signal profile corresponding to the third line position; and in response to determining that the first user has taken over the third line position, automatically processing a payment of the offered price from the user account associated with the first user to a user account associated with the third user.

7. The system of claim 1, wherein the operations further comprise receiving a request to join a group offer for removing a third user from the physical line, the group offer comprising contributions from a group of users in the physical line including the first user.

8. The system of claim 1, wherein the physical line is for access to a public venue, and wherein the operations further comprise presenting on the first user device status information of the physical line comprising at least one of a number of people in front of the first user, a number of people behind the first user, a number of tickets sold for the public venue, or a capacity of the public venue.

9. The system of claim 7, wherein the operations further comprise:
determining respective prices to join the group offer for respective receiving users in the physical line; and
presenting the group offer to the users in the group with the determined respective prices.

10. The system of claim 9, wherein the respective prices are determined based on line positions of the respective users in the group and a line position of the other user.

11. A method comprising:
obtaining, by one or more hardware processors, a line location layout of a physical premise;
determining, by the one or more hardware processors, a layout of a network of short-range wireless beacons associated with the physical premise;
determining, by the one or more hardware processors based on the line location layout of the physical premise and the layout of the network of short-range wireless beacons, a plurality of beacon signal profiles for a plurality of corresponding line positions associated with the physical premise, wherein each beacon signal profile represents signal strengths from one or more short-range wireless beacons in the network of short-range wireless beacons corresponding to the line position;
determining, by the one or more hardware processors, that a first user has entered into the physical premise by detecting a wireless communication between a first device associated with the first user and at least one of the network of short-range wireless beacons;
in response to determining that the first user has entered into the physical premise, obtaining, by the one or more hardware processors from the first device associated with the first user, first signal data indicating signals received by the first device from at least two short-range wireless beacons in the network of short-range wireless beacons;
determining, by the one or more hardware processors, a first line position of a first user in a physical line comprising a plurality of users by matching the first signal data to a first beacon signal profile in the plurality of beacon signal profiles;
using, by the one or more hardware processors, the one or more network of short-range wireless beacons to monitor movements of the plurality of users within the physical line;
estimating, by the one or more hardware processors, a value of the first line position based on a number of users being in front of the first user in the physical line and the monitored movements of the plurality of users;
generating, by the one or more hardware processors, a bidding interface for bidding line positions of the physical line, wherein the bidding interface displays the line location layout and a plurality of graphical elements representing respective line positions of the plurality of users on the line location layout, wherein a first graphical element representing the first line position of the first user is presented differently than at least one other graphical element within the plurality of graphical elements based on an instruction from the first user to offer the first line position of the first user for bidding, and wherein the first graphical element indicates the estimated value as a bid starting price;
presenting, by the one or more hardware processors, the bidding interface on at least a second user device associated with a second user from the plurality of users;
receiving, by the one or more hardware processors via the bidding interface from the second user device, an instruction for placing a bid on the first line position of the first user at a bidding price;
updating, by the one or more hardware processors, the bidding interface by modifying the first graphical element and a second graphical element representing a second line position of the second user to indicate that first and second line positions is in progress, wherein the updated bidding interface further displays the bidding price;
in response to receiving an acceptance of the bid from the first user device, determining, by the one or more hardware processors, that the second user has taken over the first line position of the first user in the physical line by matching second signal data indicating signals received by the second user device with the first beacon signal profile; and
in response to confirming that the second user has taken over the first line position of the first user, automatically transferring, by the one or more hardware processors, the bidding price from a user account associated with the second user account associated with the first user; and
updating the bidding interface to reflect changed line positions of the first user and the second user for users of the bidding interface.

12. The method of claim 11, wherein
the graphical element representing the first line position in the physical line is presented in a first color based on the instruction from the first user to offer the first line position for bidding.

13. The method of claim 12, wherein
a third graphical element representing a third line position of a third user that is unavailable for bidding is presented in a second color, and
wherein a fourth graphical element representing a fourth line position of a fourth user looking to bid for another line position is presented in a third color.

14. The method of claim 11, wherein modifying the first and second graphical elements comprises flashing the first and second graphical elements.

15. The method of claim 11, further comprising:
receiving, via the bidding interface, a selection of a third graphical element from the plurality of graphical elements; and presenting, on the bidding interface, line position information of a third line position represented by the selected third graphical element.

16. The system of claim 1, wherein the operations further comprise:
modifying the first line position of the first user based on the monitored movements of the plurality of users within the physical line; and
determining an updated value for the first line position based on the modified first line position.

17. A non-transitory machine readable medium having stored thereon machine-readable instructions executable to cause the machine to perform operations comprising:
obtaining a line location layout of a physical premise;
determining a layout of the network of short-range wireless beacons associated with the physical premise;
determining, based on the line location layout of the physical premise and the layout of the network of short-range wireless beacons, a plurality of beacon signal profiles for a plurality of corresponding line positions associated with the physical premise, wherein each beacon signal profile represents signal strengths from two or more short-range wireless beacons in the network of short-range wireless beacons corresponding to the line position;
determining that a first user has entered into the physical premise by detecting a wireless communication between a first device associated with the first user and at least one of the network of short-range wireless beacons;
in response to determining that the first user has entered into the physical premise, obtaining, from the first device associated with the first user, first signal data indicating signals received by the first device from at least two short-range wireless beacons in the network of short-range wireless beacons;
determining, for the first user, a first line position of the first user in a physical line comprising a plurality of users by matching the first signal data to a first beacon signal profile in the plurality of beacon signal profiles;
using the network of short-range wireless beacons to monitor movements of the plurality of users within the physical line;
estimating a value of the first line position based on a number of users being in front of the first user in the physical line and the monitored movements of the plurality of users;
generating a bidding interface for bidding line positions of the physical line, wherein the bidding interface displays the line location layout of the physical premise and a plurality of graphical elements representing respective line positions of the plurality of users on the displayed line location layout, wherein a first graphical element representing the first line position of the first user is presented differently than at least one other graphical element within the plurality of graphical elements based on an instruction from the first user to offer the first line position of the first user for bidding, and wherein the first graphical element indicates the estimated value as a bid starting price;
presenting the bidding interface on at least a second user device associated with a second user from the plurality of users;
receiving, via the bidding interface from the second user device, an instruction for placing a bid on the first line position of the first user at a bidding price;
updating the bidding interface by modifying the first graphical element and a second graphical element representing a second line position of the second user to indicate that the first and second line positions are in a bidding process, wherein the updated bidding interface further displays the bidding price;
in response to receiving an acceptance of the bid from the first user device, determining that the second user has taken over the first line position of the first user in the physical line by matching second signal data indicating signals received by the second user device with the first beacon signal profile; and
in response to determining that the second user has taken over the first line position of the first user, automatically transferring the bidding price from a user account associated with the second user to a user account associated with the first user.

18. The non-transitory machine readable medium of claim 17, wherein the bidding price is higher or equal to the estimated value.

19. The non-transitory machine readable medium of claim 17, wherein the operations further comprise:
modifying the first line position of the first user based on the monitored movements of the plurality of users within the physical line; and
determining an updated value for the first line position based on the modified first line position.

20. The method of claim 11, further comprising:
receiving, via the bidding interface from a third user device associated with a third user, an indication that a third line position is available for bidding;
in response to receiving the indication, initiating a group offer for removing the third user from the physical line;
determining respective prices to join the group offer for respective users in the physical line;
presenting, via the bidding interface, the respective prices to join the group offer on user devices of the respective users in the physical line;
receiving, via the bidding interface, requests to join the group offer from a group of users in the physical line including the first user; and
presenting, via the bidding interface, the group offer on the third user device.

* * * * *

UNITED STATES PATENT AND TRADEMARK OFFICE
CERTIFICATE OF CORRECTION

PATENT NO. : 10,332,168 B2
APPLICATION NO. : 14/558514
DATED : June 25, 2019
INVENTOR(S) : Robert He et al.

Page 1 of 1

It is certified that error appears in the above-identified patent and that said Letters Patent is hereby corrected as shown below:

In the Claims

In Column 17, Line 62 Claim 11 delete "processors, the one or" and add "processors, the"

In Column 17, Line 63 Claim 11 delete "more"

Signed and Sealed this
Twenty-ninth Day of October, 2019

Andrei Iancu
*Director of the United States Patent and Trademark Office*